United States Patent
Katrak et al.

(10) Patent No.: US 7,869,915 B2
(45) Date of Patent: Jan. 11, 2011

(54) METHOD AND APPARATUS FOR VALIDATING PROCESSORS USING SEED AND KEY TESTS

(75) Inventors: Kerfegar K. Katrak, Fenton, MI (US); James K. Thomas, Northville, MI (US); Theresa M. Kondel, Byron, MI (US); Monica Dykas, Leonard, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 943 days.

(21) Appl. No.: 11/734,421

(22) Filed: Apr. 12, 2007

(65) Prior Publication Data
US 2008/0255720 A1    Oct. 16, 2008

(51) Int. Cl.
*G01R 31/28*   (2006.01)
*G06F 11/00*   (2006.01)

(52) U.S. Cl. ............................. 701/33; 701/29; 701/35; 714/752; 713/189

(58) Field of Classification Search ................ 701/33, 701/29, 35; 714/752, 728; 713/189
See application file for complete search history.

(56) References Cited

U.S. PATENT DOCUMENTS

| | | | |
|---|---|---|---|
| 6,292,911 B1 * | 9/2001 | Swanson | 714/715 |
| 7,610,526 B2 * | 10/2009 | Sherlock et al. | 714/724 |
| 2007/0033467 A1 * | 2/2007 | Bancel et al. | 714/732 |
| 2007/0226562 A1 * | 9/2007 | Tkacik et al. | 714/726 |
| 2008/0195912 A1 * | 8/2008 | Mende et al. | 714/752 |
| 2008/0215924 A1 * | 9/2008 | Srivastava et al. | 714/39 |

* cited by examiner

*Primary Examiner*—Tan Q Nguyen
(74) *Attorney, Agent, or Firm*—Ingrassia Fisher & Lorenz, P.C.

(57) ABSTRACT

A method for validating a processor with a memory in a vehicle control system includes the steps of receiving a test seed, retrieving a pre-stored test key from the processor memory, calculating a check value using the test seed, and comparing the check value to the pre-stored test key.

20 Claims, 3 Drawing Sheets

| SUB-PROCESSOR SEEDS | BYTE VALUES | UPPER NIBBLE VALUES | LOWER NIBBLE VALUES |
|---|---|---|---|
| ROLLING SEED 1 | 5 | 0 | 5 |
| ROLLING SEED 2 | 54 | 3 | 6 |
| ROLLING SEED 3 | 89 | 5 | 9 |
| ROLLING SEED 4 | 106 | 6 | 10 |
| ROLLING SEED 5 | 156 | 9 | 12 |
| ROLLING SEED 6 | 175 | 10 | 15 |
| ROLLING SEED 7 | 192 | 12 | 0 |
| ROLLING SEED 8 | 243 | 15 | 3 |

FIG. 3

| MAIN PROCESSOR SEEDS | UPPER BYTE VALUE | LOWER BYTE VALUE | UPPER BYTE UPPER NIBBLE VALUES | UPPER BYTE LOWER NIBBLE VALUES | LOWER BYTE UPPER NIBBLE VALUES | LOWER BYTE LOWER NIBBLE VALUES |
|---|---|---|---|---|---|---|
| ROLLING SEED 1 | 5 | 225 | 0 | 5 | 14 | 1 |
| ROLLING SEED 2 | 54 | 30 | 3 | 6 | 1 | 14 |
| ROLLING SEED 3 | 89 | 135 | 5 | 9 | 8 | 7 |
| ROLLING SEED 4 | 106 | 120 | 6 | 10 | 7 | 8 |
| ROLLING SEED 5 | 156 | 75 | 9 | 12 | 4 | 11 |
| ROLLING SEED 6 | 175 | 180 | 10 | 15 | 11 | 4 |
| ROLLING SEED 7 | 192 | 210 | 12 | 0 | 13 | 2 |
| ROLLING SEED 8 | 243 | 45 | 15 | 3 | 2 | 13 |

METHOD AND APPARATUS FOR VALIDATING PROCESSORS USING SEED AND KEY TESTS

TECHNICAL FIELD

The present invention generally relates to control systems found in automobiles and other vehicles, and more particularly relates to methods and systems for validating processors within a vehicle-based control system.

BACKGROUND OF THE INVENTION

Modern automobiles and other vehicles may include sophisticated on-board computer systems that monitor the status and operation of various components of the vehicle (for example, the vehicle engine, transmission, brakes, suspension, and/or other components of the vehicle). Many of these computer systems may also adjust or control one or more operating parameters of the vehicle in response to operator instructions, road or weather conditions, operating status of the vehicle, and/or other factors.

Various types of microcontroller or microprocessor-based controllers found in many conventional vehicles include supervisory control modules (SCMs), engine control modules (ECMs), controllers for various vehicle components (for example, anti-lock brakes, electronically-controlled transmissions, or other components), among other modules. Such controllers are typically implemented with any one of numerous types of processors that appropriately receive data from one or more sensors or other sources, process the data to create suitable output signals, and provide the output signals to control actuators, dashboard indicators and/or other data responders as appropriate. Such processors may include a main processor for performing these and other functions, and a sub-processor for monitoring the arithmetic logic unit and/or other aspects pertaining to the operation of the main processor.

The processors in a vehicle control system may be periodically or continuously validated for proper operation, often by another processor using a seed and key strategy. While such validation techniques generally perform quite well, in some circumstances the vehicle control system and specified security metrics may not allow for optimal performance of such techniques due, for example, to an increase in validation requirements and/or a decrease in the time and/or memory allotted for doing so. Also, the processors used to validate one another may have different sizes or other features, in which different implementations may be appropriate.

Accordingly, it is desirable to validate the processors more quickly to meet specified security metrics, to reduce memory utilized by such validation techniques, to tailor the validation techniques to the individual processor, and/or to provide improved validation. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for validating a processor with a memory in a vehicle control system. In one embodiment, and by way of example only, the method comprises the steps of receiving a test seed, retrieving a pre-stored test key from the processor memory, calculating a check value using the test seed, and comparing the check value to the pre-stored test key.

A method is also provided for validating a first processor and a second processor, each having a memory, and disposed in a vehicle control system. In one embodiment, and by way of example only, the method comprises the steps of transmitting a first test seed from the second processor to the first processor, transmitting a second test seed from the first processor to the second processor, retrieving a first test key from the first processor memory, retrieving a second test key from the second processor memory, calculating a first check value using the first test seed, calculating a second check value using the second test seed, comparing the first check value to the first test key, and comparing the second check value to the second test key.

An apparatus is provided for a multi-processor vehicle control system comprising. In one embodiment, and by way of example only, the system comprises a first processor and a second processor. The first processor includes a memory having a first test key and a first algorithm stored therein. The first processor is configured to receive a first test seed, and is operable to selectively transmit a second test seed, retrieve the first test key from the first processor memory, calculate a first check value using the first test seed and the first algorithm, and compare the first check value to the first test key. The second processor includes a memory having a second test key and a second algorithm stored therein. The second processor is configured to receive the second test seed from the first processor, and is operable to selectively transmit the first test seed to the first processor, retrieve the second test key from the second processor memory, calculate a second check value using the second test seed and the second algorithm, and compare the second check value to the second test key.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, various methods and systems are presented for validating one or more processors in a vehicle control system. With reference to the FIG. 1, an exemplary control system 100 suitably includes any number of modules 102, 104 that exchange data via a data link 106. In various embodiments, data link 106 is a Controller Area Network (CAN) or other data network connection. Modules 102, 104 may be any one of numerous types of systems or devices having any one of numerous types of data processing hardware, such as any one of numerous types of microprocessors or microcontrollers.

Figure 1:
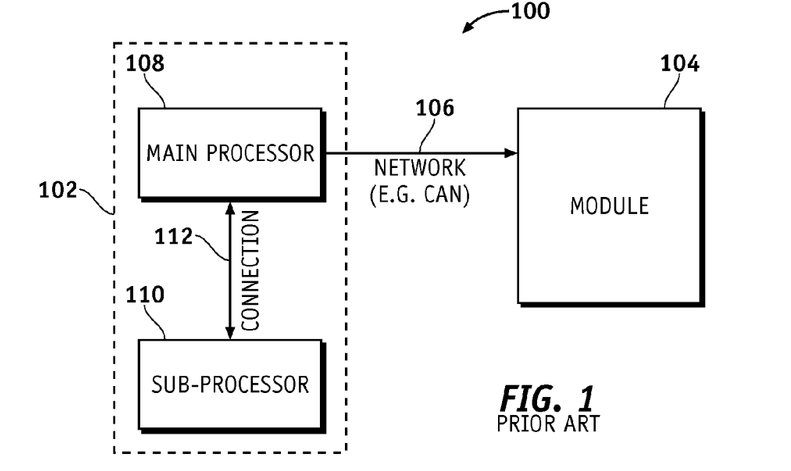
FIG. 1 depicts an exemplary control system for a vehicle featuring a plurality of modules that exchange data via a data link.

One or more modules 102 suitably include any number of processors, such as a main processor 108 and a sub-processor 110, and a data connection 112. The main processor 108 is configured to communicate with one or more other modules 104 via the data link 106. The sub-processor 110 is configured to monitor operation of the main processor 108, and to take appropriate corrective action, such as disabling the main processor 108, if it is determined that the main processor 108 is not operating properly. The main processor 108 is configured to monitor the operation of the sub-processor 110, and to take appropriate corrective action, such as resetting the sub-processor 110, if it is determined that the sub-processor 110 is not operating properly.

In various embodiments, the data connection 112 is a UART or other internal connection (e.g., a bus connection) within module 102. The main processor 108 and/or the sub-processor 110 may also be configured to communicate with one or more non-depicted sensors, actuators, and/or other devices. It will be appreciated that the module 102 may contain any number of different processors. It will similarly be appreciated that the control system 100 depicted in FIG. 1 is for illustrative purposes only, and that the control system 100 can take any one of a number of different configurations.

Figure 2:
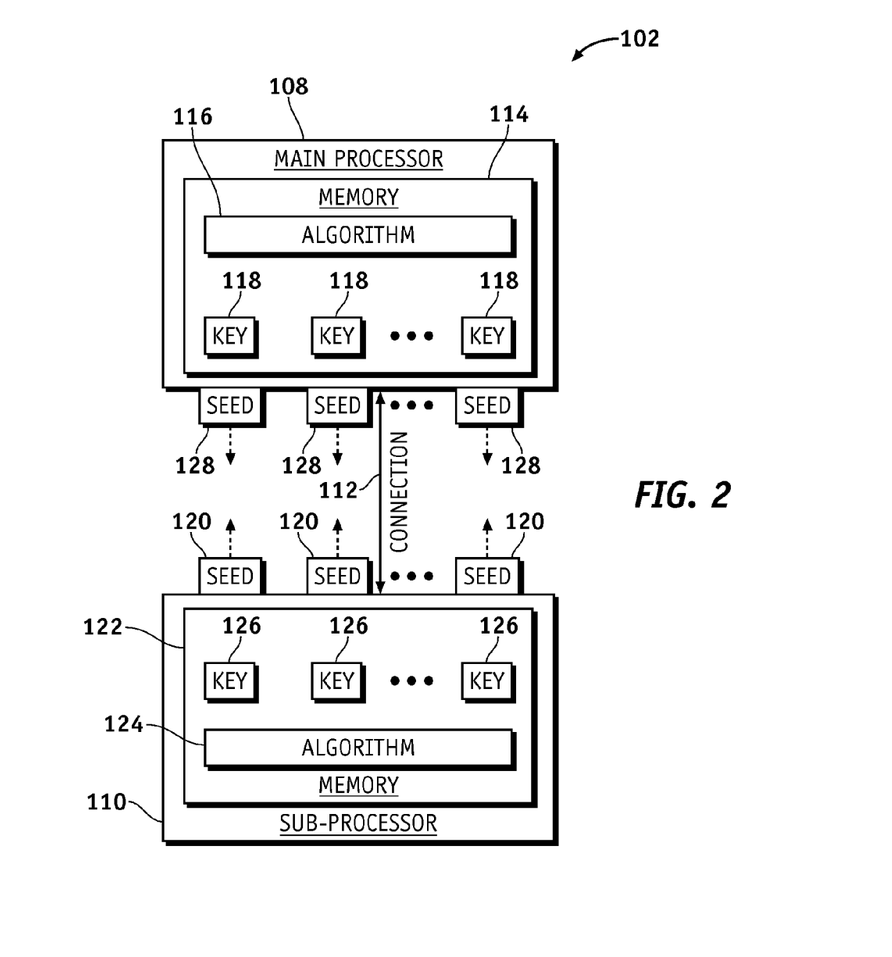
FIG. 2 depicts an exemplary embodiment of a module that can be used in the control system of FIG. 1, and that includes a main processor and a sub-processor configured to validate one another using seed and key tests.

FIG. 2 depicts an embodiment of the module 102 in which the main processor 108 and the sub-processor 110 are configured to validate one another using a "rolling" seed and key test. The main processor 108 includes a main processor memory 114, which may include read-only memory (ROM), and/or other types of memory. The main processor memory 114 is configured to store a main processor algorithm 116 and a plurality of main processor keys 118. The main processor 108 is further configured to receive a plurality of main processor seeds 120 from the sub-processor 110.

Each main processor seed 120 is used in conjunction with a specific corresponding main processor key 118 to assist in validating the sub-processor 110. Specifically, the main processor 108 is configured to retrieve and utilize the main processor algorithm 116 to calculate a check value from each main processor seed 120, and to then compare the calculated check value to the corresponding main processor key 118. If the check value is equal to the corresponding main processor key 118, this serves as an indication that the sub-processor 110 is operating properly. Conversely, if the check value is not equal to the corresponding main processor key 118, this serves as an indication that there may be a problem with the sub-processor 110.

Similarly, the sub-processor 110 includes a sub-processor memory 122, which may include read-only memory (ROM), and/or other types of memory. The sub-processor memory 122 is configured to store a sub-processor algorithm 124 and a plurality of sub-processor keys 126. The sub-processor 110 is further configured to receive a plurality of sub-processor seeds 128 from the main processor 108.

Each sub-processor seed 128 is used in conjunction with a specific corresponding sub-processor key 126 to assist in validating the main processor 108. Specifically, the sub-processor 110 is configured to retrieve and utilize the sub-processor algorithm 124 to calculate a check value from each sub-processor seed 128, and to then compare the calculated check value to the corresponding sub-processor key 126. If the check value is equal to the corresponding sub-processor key 126, this serves as an indication that the main processor 108 is operating properly. Conversely, if the check value is not equal to the corresponding sub-processor key 126, this serves as an indication that there may be a problem with the main processor 108.

The main processor seeds 120 are preferably stored in the sub-processor memory 122 prior to being transmitted from the sub-processor 110 to the main processor 108, and the sub-processor seeds 128 are preferably stored in the main processor memory 114 prior to being transmitted from the main processor 108 to the sub-processor 110; however, in certain embodiments this may vary. In addition, preferably, the main processor seeds 120, the sub-processor seeds 128, the main processor keys 118, the sub-processor keys 126, the main processor algorithm 116, and the sub-processor algorithm 124 are tailored to reflect the different functions and/or features of the main processor 108 and the sub-processor 110. For example, in typical situations in which the main processor 108 and the sub-processor 110 have different instruction sets, these processors will also preferably have different algorithms, seeds, and keys. However, in certain other embodiments, the main processor 108 and the sub-processor 110 may share one or more common algorithms or variations thereof.

The size of the seeds and keys can likewise be tailored according to the size of the respective processors and, in a preferred embodiment, the main processor keys 118 and the sub-processor keys 126 are twice the size of the main processor seeds 120 and the sub-processor seeds 128, respectively. For example, in one embodiment of a module 102 with a 32-bit main processor 108 and a 16-bit sub-processor 110 discussed below in connection with FIGS. 3 and 4, each main processor seed 120 is preferably a word, or two bytes, in size; each main processor key 118 is preferably a double word, or four bytes, in size; each sub-processor seed 128 is preferably a byte, or eight bits, in size; and each sub-processor key 126 is preferably a word, or two bytes, in size. However, in various other embodiments the size and/or structure of the various seeds and keys may differ from that set forth above, for example due to different processor sizes, functional requirements, and/or for one or more other reasons.

Figure 3:
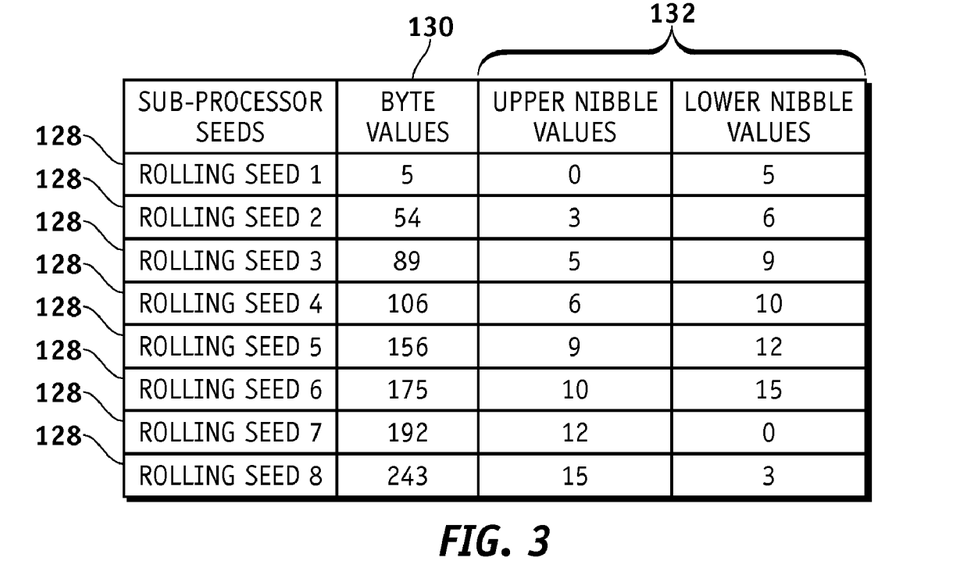
FIG. 3 depicts a chart illustrating exemplary seeds that can be used by the sub-processor of FIG. 2 in validating the main processor.
Figure 4:
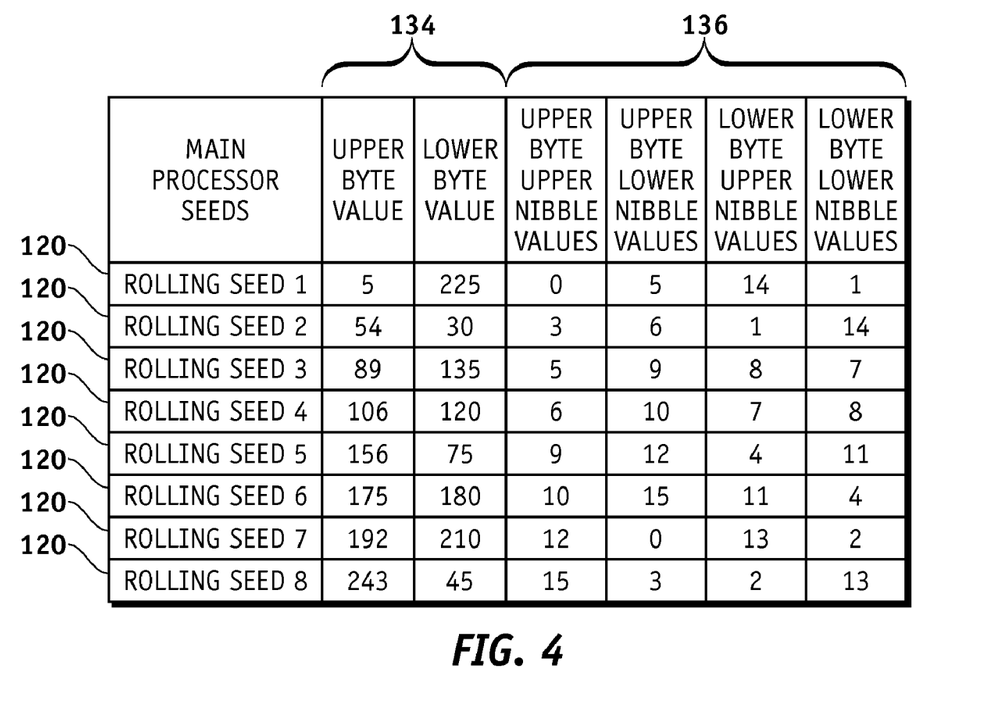
FIG. 4 depicts a chart illustrating exemplary seeds that can be used by the main processor of FIG. 2 in validating the sub-processor.

In addition, and as will be discussed now in connection with the specific embodiment of FIGS. 3 and 4, the main processor seeds 120 and the sub-processor seeds 128 are each preferably structured to minimize potential memory errors. Specifically, FIG. 3 depicts a chart illustrating eight exemplary sub-processor seeds 128 for a 16-bit sub-processor 110, in which each sub-processor seed 128 has a particular byte structure designed to minimize memory fault errors. FIG. 4 depicts a chart illustrating eight exemplary main processor seeds 120 for a 32-bit main processor 108, in which each main processor seed 120 has a particular word structure designed to minimize memory fault errors. While FIGS. 3 and 4 depict eight illustrative main processor seeds 120 and sub-processor seeds 128, it will be appreciated that any number of different seeds can be used.

As shown in FIG. 3, each sub-processor seed 128 preferably is at least one half structure different from each other sub-processor seed 128. Most preferably, each sub-processor seed 128 is also divisible into one or more sub-structures, with each sub-structure being at least one half sub-structure different from a corresponding sub-structure in each other sub-processor seed 128.

Specifically, each sub-processor seed 128 preferably has a primary structure value 130 reflecting a fixed number of sequential binary digits, so that each sequential binary digit reflected in the primary structure value 130 of a given sub-processor seed 128 has a corresponding sequential binary digit reflected in the primary structure value 130 of each of the other sub-processor seeds 128. In addition, each sub-processor seed 128 preferably has a plurality of sub-structure values 132, with each sub-structure value 132 reflecting a subset of the sequential binary digits from the primary structure value 130. Preferably, each sub-structure value 132 of each sub-processor seed 128 has a corresponding sub-structure value 132 in each of the other sub-processor seeds 128, and each sequential binary digit reflected in each sub-structure value 132 of each sub-processor seed 128 has a corresponding sequential binary digit reflected in the corresponding sub-structure value 132 of each other sub-processor seed 128.

Preferably, at least fifty percent of the sequential binary digits reflected in the primary structure value 130 of each sub-processor seed 128 are different from the corresponding sequential binary digits reflected in the primary structure value 130 of each of the other sub-processor seeds 128, so that each of the primary structure values 130 are at least one half structure different from one another. Most preferably, at least fifty percent of the sequential binary digits reflected in each sub-structure value 132 of each sub-processor seed 128 are also different from the corresponding sequential binary digits reflected in the corresponding sub-structure value 132 of each of the other sub-processor seeds 128, so that each of the sub-structure values 132 are at least one half structure different from one another.

For example, in the embodiment of FIG. 3, each sub-processor seed 128 has a primary structure value 130 reflecting eight sequential binary digits. The primary structure value 130 for the first sub-processor seed 128 is 5, or 00000101 in binary form, while the primary structure value 130 of the second sub-processor seed 128 is 54, or 00110110 in binary form, and so on. The sub-structure values 132 in this example include an upper nibble value and a lower nibble value. The upper nibble value for the first sub-processor seed 128 is 0, or 0000 in binary form, while the upper nibble value for the second sub-processor seed 128 is 3, or 0011 in binary form. The lower nibble value for the first sub-processor seed 128 is 5, or 0101 in binary form, while the lower nibble value for the second sub-processor seed 128 is 6, or 0110 in binary form.

As shown in these illustrative examples, and the other illustrative sub-processor seeds 128 of FIG. 3, at least four of the eight sequential binary digits reflected in the primary structure value 130 of each sub-processor seed 128 are different from the corresponding sequential binary digits reflected in the primary structure value 130 of each other sub-processor seed 128. In addition, at least two of the four sequential binary digits reflected in each sub-structure value 132 of each sub-processor seed 128 are different from the corresponding sequential binary digits reflected in the corresponding sub-structure value 132 of each of the other sub-processor seeds 128.

Similarly, as shown in FIG. 4, each main processor seed 120 preferably is at least one half structure different from each other main processor seed 120. Most preferably, each main processor seed 120 is also divisible into one or more sub-structures, with each sub-structure being at least one half sub-structure different from a corresponding sub-structure in each other main processor seed 120.

Specifically, each main processor seed 120 preferably has one or more primary structure values 134 reflecting a fixed number of sequential binary digits, so that each sequential binary digit reflected in the primary structure value 134 of a given main processor seed 120 has a corresponding sequential binary digit reflected in the primary structure value 134 of each of the other main processor seeds 120, thereby being at least one half structure different from one another. In addition, each main processor seed 120 preferably has a plurality of sub-structure values 136, with each sub-structure value 136 reflecting a subset of the sequential binary digits from the primary structure value 134. Preferably each sub-structure value 136 of each main processor seed 120 has a corresponding sub-structure value 136 in each of the other main processor seeds 120, and each sequential binary digit reflected in each sub-structure value 136 of each main processor seed 120 has a corresponding sequential binary digit reflected in the corresponding sub-structure value 136 of each other main processor seed 120, thereby being at least one half structure different from one another.

Preferably, at least fifty percent of the sequential binary digits reflected in the primary structure value 134 of each main processor seed 120 are different from the corresponding sequential binary digits reflected in the primary structure value 134 of each of the other main processor seeds 120. Most preferably, at least fifty percent of the sequential binary digits reflected in each sub-structure value 136 of each main processor seed 120 are also different from the corresponding sequential binary digits reflected in the corresponding sub-structure value 136 of each of the other main processor seeds 120.

For example, in the embodiment of FIG. 4, each main processor seed 120 has two primary structure values 134, namely an upper byte value and a lower byte value, each reflecting eight sequential binary digits. The sub-structure values 136 in this example include an upper byte upper nibble value, an upper byte lower nibble value, a lower byte upper nibble value, and a lower byte lower nibble value. Each of the upper byte values and lower byte values reflect eight sequential binary digits, while each of the upper byte upper nibble values, upper byte lower nibble values, lower byte upper nibble values, and lower byte lower nibble values reflect four sequential binary digits. As shown in this example, certain sub-structure values 136 may reflect subsets of the sequential binary digits reflected in certain other sub-structure values 136.

As shown in the illustrative main processor seeds 120 of FIG. 4, at least four of the eight sequential binary digits reflected in each primary structure value 134 of each main processor seed 120 are preferably different from the corresponding sequential binary digits reflected in the corresponding primary structure value 134 of each other main processor seed 120, thereby being at least one half structure different from one another. In addition, at least two of the four sequential binary digits reflected in each sub-structure value 136 of each main processor seed 120 are preferably different from the corresponding sequential binary digits reflected in the corresponding sub-structure value 136 of each of the other main processor seeds 120, thereby being at least one half structure different from one another.

The setup of the primary structure values 130, 134 and sub-structure values 132, 136 for the sub-processor and main processor seeds 128, 120 as described above can be advantageous in multiple respects. First, this setup minimizes the possibility of memory errors that could potentially lead to one seed being misread as another seed. In addition, the specificity of the different seeds can be tailored toward specific corresponding keys, so that the different seeds need not necessarily be sent between processors in any particular order. It will be appreciated that the illustrative main processor seeds 120 shown in FIG. 4 may also be used as sub-processor seeds 128 in certain embodiments, and vice versa, and/or that various other main and/or sub-processor seeds 120, 128 may be used. It will similarly be appreciated that, while FIGS. 3 and 4 depict the primary structure values 134 of the main processor seeds 120 as reflecting a larger number of sequential bits than the primary structure values 130 of the sub-processor seeds 128, in other embodiments the primary structure values 130 of the sub-processor seeds 128 may reflect a number of sequential bits that is greater than or equal to the number of sequential bits reflected in the primary structure values 134 of the main processor seeds 120.

Figure 5:
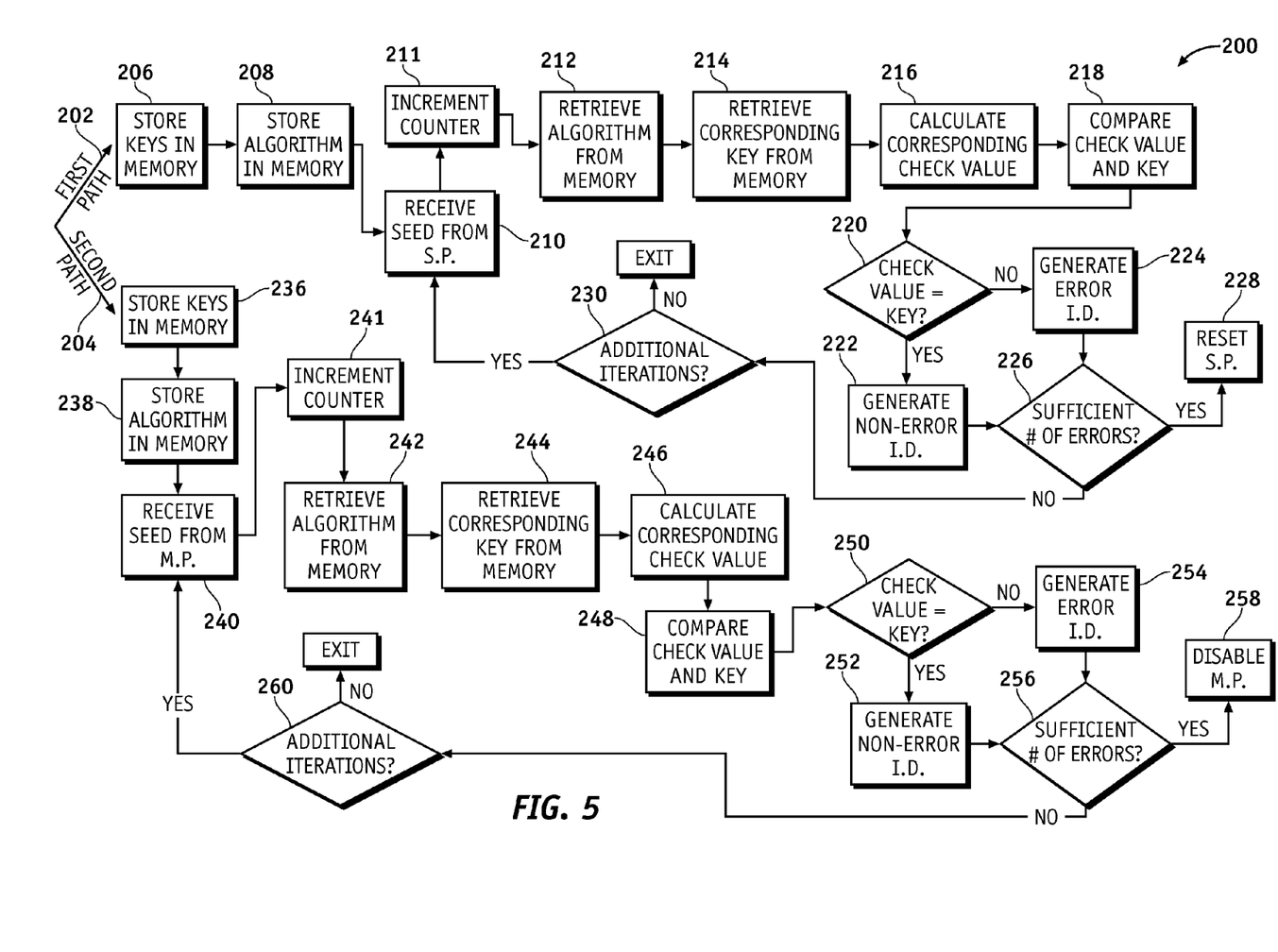
FIG. 5 depicts a flowchart for an exemplary embodiment of a process that can be used for validating processors such as those of FIG. 2 using seeds such as those in FIGS. 3 and 4.

Turning now to FIG. 5, a flowchart is provided for an embodiment of a process 200 which can be used for validating processors such as those depicted in FIGS. 1 and 2, and which can utilize seeds such as those depicted in FIGS. 3 and 4. In the process 200, the main processor 108 validates the sub-processor 110 via various steps along a first path 202, while the sub-processor 110 validates the main processor 108 via various steps along a second path 204, as set forth in FIG. 5 and described in greater detail below. In a preferred embodiment the steps of the first path 202 and the second path 204 are conducted simultaneously or at least substantially concurrently; however, the first and second paths 202, 204 will be discussed sequentially below for ease of reference.

Proceeding first along the first path 202, in step 206 the main processor keys 118 are stored in the main processor memory 114. In step 208, the main processor algorithm 116 is stored in the main processor memory 114. It will be appreciated that steps 206 and 208 can be conducted simultaneously or in either order, as is the case with various other steps in the process 200, and/or that in certain preferred embodiments the main processor keys 118 and/or the main processor algorithm 116 may be pre-stored in the main processor memory 114 during manufacture or otherwise long before any main processor seeds 120 are received.

In step 210, the main processor 108 receives a main processor seed 120 transmitted from the sub-processor 110 along the data connection 112. Next, in step 211, a counter is incremented so as to keep track of the number of main processor seeds 120 received. The counter preferably is incremented by a fixed number each iteration such that each new number on the counter is at least a half structure separated from the number used in a successive iteration, in order to help prevent the counter being influenced by any bit errors. For example, the counter can be incremented by units of three (e.g., 3, 6, 9, 12, 15, . . . ) or by units of five (e.g., 5, 10, 15, 20, 25, . . . ), although it will be appreciated that in other embodiments the counter may be incremented in any one of a number of different ways.

Next, in steps 212 and 214, respectively, the main processor 108 retrieves, from the main processor memory 114, the main processor algorithm 116, and the main processor key 118 corresponding with the main processor seed 120 received from the sub-processor 110 in step 210. Next, in step 216, the main processor 108 calculates a check value from the main processor seed 120 received in step 210, using the main processor algorithm 116 retrieved in step 212. Next, the main processor 108 compares, in step 218, the check value to the main processor key 118 retrieved in step 214 that corresponds to the received main processor seed 120, and then determines in step 220 whether these values are equal.

If it is determined in step 220 that the check value is equal to the corresponding main processor key 118, then, in step 222, a non-error identification is generated and preferably stored in the main processor memory 114. Otherwise, if it is determined in step 220 that the check value is not equal to the corresponding main processor key 118, then, in step 224, an error identification is generated and preferably stored in the main processor memory 114.

In one preferred embodiment the error identification and the non-error identification of a particular iteration of the process along the first path 202 each reflect a plurality of corresponding sequential binary digits, such that at least fifty percent of the binary digits in the error identification are different from the corresponding sequential binary digits of the non-error identification. Moreover, as the process proceeds through different iterations along the first path 202 (as described below in connection with step 230), preferably different identification values are used in different iterations such that any two consecutive error identification values differ in at least fifty percent of the corresponding sequential binary digits, and any two consecutive non-error identification values similarly differ in at least fifty percent of the corresponding sequential binary digits. This helps to further prevent memory errors, for example by preventing a particular identification to be stuck on a particular value. For example, in one embodiment the non-error identification values generated in various iterations can alternate between 9 and 12, while the error identification values generated in various iterations can alternate between 5 and 10, or vice versa. However, it will be appreciated that various other values can also be used in other embodiments.

Next, in step 226, it is determined whether or not corrective action is necessary with respect to the sub-processor 110. If it is determined in step 226 that at least a predetermined number of error identification values have been generated within a certain number of iterations, then, in step 228, the main processor 108 may reset the sub-processor 110 and/or take other corrective action. Otherwise, the process proceeds to step 230, in which it is determined whether or not there is at least one additional main processor seed 120 to process in a new iteration, based on the above-described counter incrementation.

If it is determined in step 230 that there is at least one additional main processor seed 120 for a new iteration, then the process returns to step 210 for a new iteration of steps 210-230. In this new iteration, a new main processor seed 120 is received by the main processor 108, from the sub-processor 110. Preferably steps 211 through 230 are then repeated using this new main processor seed 120, a new corresponding main processor key 118 retrieved from the main processor memory 114, and the same main processor algorithm 116. However, it will be appreciated that in other embodiments there may be certain variations to the process, for example in that different main processor algorithms 116 may be used.

Preferably, the process 200 proceeds along the second path 204 simultaneously with, or at least substantially contemporaneously with, the first path 202. The second path 204 begins with step 236, in which the sub-processor keys 126 are stored in the sub-processor memory 122. In step 238, the sub-processor algorithm 124 is stored in the sub-processor memory 122. Similar to the first path 202, it will be appreciated that steps 236 and 238 can be conducted simultaneously or in either order, and/or that in certain preferred embodiments the sub-processor keys 126 and/or the sub-processor algorithm 124 may be pre-stored in the sub-processor memory 122 during manufacture or otherwise long before any sub-processor seeds 128 are received.

In step 240, the sub-processor 110 receives a sub-processor seed 128 transmitted from the main processor 108 along the data connection 112. Next, in step 241, a counter is incremented so as to keep track of the number of sub-processor seeds 128 received. Similar to the counter in the first path 202, the counter in the second path 204 preferably is incremented by a fixed number each iteration such that each new number on the counter is at least a half structure separated from the number used in a successive iteration, in order to help prevent the counter being influenced by any bit errors. For example, the counter can be incremented by units of three (e.g., 3, 6, 9, 12, 15, . . . ) or by units of five (e.g., 5, 10, 15, 20, 25, . . . ), although it will be appreciated that in other embodiments the counter may be incremented in any one of a number of different ways.

Next, in steps 242 and 244, respectively, the sub-processor 110 retrieves, from the sub-processor memory 122, the sub-processor algorithm 124, and the sub-processor key 126 corresponding with the sub-processor seed 128 received from the main processor 108 in step 240. Next, in step 246, the sub-processor 110 calculates a check value from the sub-processor seed 128 received in step 240, using the sub-processor algorithm 124 retrieved in step 242. Next, the sub-processor 110 compares, in step 248, the check value with the corresponding sub-processor key 126, and then determines, in step 250, whether these values are equal.

If it is determined in step 250 that the check value is equal to the corresponding sub-processor key 126, then, in step 252, a non-error identification is generated and preferably stored in the sub-processor memory 122. Otherwise, if it is determined in step 250 that the check value is not equal to the corresponding sub-processor key 126, then, in step 254, an error identification is generated and preferably stored in the sub-processor memory 122. The error identification values and non-error identification values in the second path 204 are preferably similar or identical to those discussed above with respect to the first path 202.

Next, in step 256, it is determined whether or not corrective action is necessary with respect to the main processor 108. If it is determined in step 256 that at least a predetermined number of error identification values have been generated within a certain number of iterations, then, in step 258, the sub-processor 110 may disable the main processor 108 in whole or in part and/or take other appropriate corrective action. Otherwise, the process proceeds to step 260, in which it is determined whether or not there is at least one additional sub-processor seed 128 to process in a new iteration. It is noted that, because the main processor 108 may have more direct control over important vehicle systems, the process may be relatively more stringent with respect to potential errors in the main processor 108, as compared with potential errors in the sub-processor 110. For example, for illustrative purposes only, if corrective action were to be called for in step 226 if a potential error with the sub-processor 110 is detected four times in a row, or six times out of ten, then corrective action may be called for in step 256 if a potential error with the main processor 108 is detected two times in a row, or four times out of six. However, it will be appreciated that specific criteria for corrective action for the main processor 108 and/or the sub-processor 110 may vary in different embodiments.

If it is determined in step 260 that there is at least one additional sub-processor seed 128 for a new iteration, then the process returns to step 240 for a new iteration of steps 240-260. In this new iteration, a new sub-processor seed 128 is received by the sub-processor 110, from the main processor 108. Preferably steps 241 through 260 are then repeated using this new sub-processor seed 128, a new corresponding sub-processor key 126 from the sub-processor memory 122, and the same sub-processor algorithm 124. However, it will be appreciated that in other embodiments there may be certain variations to the process, for example in that different sub-processor algorithms 124 may be used.

The methods and apparatus described above offer a number of potential advantages. For example, improved security metrics can be met as a result of time savings in the testing process, for example because the test keys are already stored in the respective processor memories by the time the seeds are transmitted and received. In addition, this can result in less traffic among connections between the processors and/or other modules, as the keys do not need to be sent along the connections. As another example, in addition to various other potential advantages, different seeds, keys, and/or algorithms can be used, and tailored to the different types of processors in a module or system. Moreover, the seeds and keys need not be dependent on processor memory structure, and seeds and keys for different types of processors need not be synchronized. Accordingly, the seeds may be transmitted on virtually any type of bus or other data connection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for use with a processor having a memory, and disposed in a vehicle control system, the method comprising the steps of:
   receiving a test seed;
   retrieving a pre-stored test key from the processor memory;
   calculating a check value using the test seed;
   comparing the check value to the pre-stored test key, generating a comparison; and
   validating the processor using the comparison.

2. The method of claim 1, further comprising the step of:
   retrieving an algorithm from the processor memory,
   wherein the check value is calculated also using the algorithm, and the processor is deemed to be valid if the check value is equal to the pre-stored test key.

3. The method of claim 2, further comprising the steps of:
   receiving a second test seed, the second test seed being different from the test seed;
   retrieving a second pre-stored test key from the processor memory, the second pre-stored test key being different from the pre-stored test key;
   calculating a second check value using the second test seed and the algorithm; and
   comparing the second check value to the second pre-stored test key.

4. The method of claim 3, wherein:
   the test seed includes a first structure value reflecting a plurality of sequential binary digits;
   the second test seed includes a second structure value reflecting a plurality of sequential binary digits, each such sequential binary digit having a corresponding sequential binary digit reflected in the first structure value; and
   at least fifty percent of the sequential binary digits reflected in the second structure value are different than the corresponding sequential binary digits reflected in the first structure.

5. A method for use with a first processor and a second processor disposed in a vehicle control system, the first processor and the second processor each having a memory, the method comprising the steps of:
- transmitting a first test seed from the second processor to the first processor;
- transmitting a second test seed from the first processor to the second processor;
- retrieving a first test key from the first processor memory;
- retrieving a second test key from the second processor memory;
- calculating a first check value using the first test seed;
- calculating a second check value using the second test seed;
- comparing the first check value to the first test key, generating a first comparison;
- comparing the second check value to the second test key, generating a second comparison;
- validating the second processor using the first comparison; and
- validating the first processor using the second comparison.

6. The method of claim 5, further comprising the steps of:
- retrieving a first algorithm from the first processor memory; and
- retrieving a second algorithm from the second processor memory;

wherein:
- the first check value is calculated also using the first algorithm;
- the second check value is calculated also using the second algorithm;
- the second processor is deemed to be valid if the first check value is equal to the first test key; and
- the first processor is deemed to be valid if the second check value is equal to the second test key.

7. The method of claim 6, further comprising the steps of:
- transmitting a third test seed from the second processor to the first processor, the third test seed being different from the first test seed;
- transmitting a fourth test seed from the first processor to the second processor, the fourth test seed being different from the second test seed;
- retrieving a third test key from the first processor memory, the third test key being different from the first test key;
- retrieving a fourth test key from the second processor memory, the fourth test key being different from the second test key;
- calculating a third check value using the third test seed and the first algorithm;
- calculating a fourth check value using the fourth test seed and the second algorithm;
- comparing the third check value to the third test key, generating a third comparison;
- comparing the fourth check value to the fourth test key, generating a fourth comparison;
- further validating the second processor using the third comparison; and
- further validating the first processor using the fourth comparison.

8. The method of claim 7, wherein:
- the first test seed includes one or more first structure values each reflecting a plurality of sequential binary digits;
- the third test seed includes one or more third structure values reflecting a plurality of sequential binary digits, each third structure value having a corresponding first structure value in the first test seed, and each such sequential binary digit having a corresponding sequential binary digit reflected in the corresponding first structure value; and
- at least fifty percent of the sequential binary digits reflected in each third structure value are different than the corresponding sequential binary digits reflected in the corresponding first structure value.

9. The method of claim 8, wherein:
- the second test seed includes one or more second structure values each reflecting a plurality of sequential binary digits;
- the fourth test seed includes one or more fourth structure values reflecting a plurality of sequential binary digits, each fourth structure value having a corresponding second structure value in the second test seed, and each such sequential binary digit having a corresponding sequential binary digit reflected in the corresponding second structure value; and
- at least fifty percent of the sequential binary digits reflected in each fourth structure value are different than the corresponding sequential binary digits reflected in the corresponding second structure value.

10. The method of claim 5, wherein the step of validating the processor comprises the steps of:
- conducting a plurality of first error checks, each first error check conducted in a corresponding iteration, and each first error check configured to detect errors in the second processor based at least in part on a comparison between a check value and a corresponding test key in the corresponding iteration; and
- assigning a first identifier corresponding to each first error check, each first identifier dependent at least in part on whether an error is detected in the corresponding first error check, and the first identifier corresponding to each first error check differing from the first identifiers corresponding to any immediately preceding first error check and any immediately succeeding first error check.

11. The method of claim 10, further comprising the steps of:
- conducting a plurality of second error checks, each second error check conducted in a corresponding iteration, and each second error check configured to detect errors in the first processor based at least in part on a comparison between a check value and a corresponding test key in the corresponding iteration; and
- assigning a second identifier corresponding to each second error check, each second identifier dependent at least in part on whether an error is detected in the corresponding second error check, and the second identifier corresponding to each second error check differing from the second identifiers corresponding to any immediately preceding second error check and any immediately succeeding second error check.

12. The method of claim 11, further comprising the steps of:
- resetting the second processor, if an error is detected in the second processor in the first error checks in at least a first predetermined number of iterations; and
- disabling the first processor, if an error is detected in the first processor in the second error checks in at least a second predetermined number of iterations.

13. A multi-processor vehicle control system comprising:
a first processor including a memory having a first test key and a first algorithm stored therein, the first processor configured to receive a first test seed, and operable to selectively transmit a second test seed, retrieve the first test key from the first processor memory, calculate a first check value using the first test seed and the first algorithm, and compare the first check value to the first test key thereby generating a first comparison; and a second processor including a memory having a second test key and a second algorithm stored therein, the second processor configured to receive the second test seed from the first processor, and operable to selectively transmit the first test seed to the first processor, retrieve the second test key from the second processor memory, calculate a second check value using the second test seed and the second algorithm, and compare the second check value to the second test key thereby generating a second comparison, wherein the first processor validates the second processor using the first comparison and the second processor validates the first processor using the second comparison.

14. The multi-processor vehicle control system of claim 13, wherein:

the first processor memory also has a third test key stored therein, the third test key being different from the first test key;

the second processor memory also has a fourth test key stored therein, the fourth test key being different from the second test key;

the first processor is further configured to receive a third test seed different from the first test seed, and operable to selectively transmit a fourth test seed different from the second test seed, retrieve the third test key from the first processor memory, calculate a third check value using the third test seed and the first algorithm, and compare the third check value to the third test key to generate a third comparison, and further validate the second processor using the third comparison; and the second processor is further configured to receive the fourth test seed from the first processor, and operable to selectively transmit the third test seed to the first processor, retrieve the fourth test key from the second processor memory, calculate a fourth check value using the fourth test seed and the second algorithm, and compare the fourth check value to the fourth test key to generate a fourth comparison, and further validate the first processor using the fourth comparison.

15. The multi-processor vehicle control system of claim 14, wherein:

the first test seed includes one or more first structure values each reflecting a plurality of sequential binary digits;

the third test seed includes one or more third structure values reflecting a plurality of sequential binary digits, each third structure value having a corresponding first structure value in the first test seed, and each such sequential binary digit having a corresponding sequential binary digit reflected in the corresponding first structure value; and at least fifty percent of the sequential binary digits reflected in each third structure value are different than the corresponding sequential binary digits reflected in the corresponding first structure value.

16. The multi-processor vehicle control system of claim 15, wherein:

the second test seed includes one or more second structure values each reflecting a plurality of sequential binary digits;

the fourth test seed includes one or more fourth structure values reflecting a plurality of sequential binary digits, each fourth structure value having a corresponding second structure value in the second test seed, and each such sequential binary digit having a corresponding sequential binary digit reflected in the corresponding second structure value; and at least fifty percent of the sequential binary digits reflected in each fourth structure value are different than the corresponding sequential binary digits reflected in the corresponding second structure value.

17. The multi-processor vehicle control system of claim 15, wherein:

the first test seed also includes a plurality of first sub-structure values, each first sub-structure value reflecting a subset of the sequential binary digits reflected in at least one first structure value;

the third test seed also includes a plurality of third sub-structure values, each third sub-structure value reflecting a subset of the sequential binary digits reflected in at least one third structure value, each third sub-structure value having a corresponding first sub-structure value in the first test seed, and each such sequential binary digit having a corresponding sequential binary digit reflected in the corresponding first sub-structure value; and at least fifty percent of the sequential binary digits reflected in each third sub-structure value are different than the corresponding sequential binary digits reflected in the corresponding first sub-structure value.

18. The multi-processor vehicle control system of claim 13, wherein the first processor is further configured to:

conduct a plurality of first error checks, each first error check conducted in a corresponding iteration, and each first error check configured to detect errors in the second processor based at least in part on a comparison between a check value and a corresponding test key in the corresponding iteration; and assign a first identifier corresponding to each first error check, each first identifier dependent at least in part on whether an error is detected in the corresponding first error check, and the first identifier corresponding to each first error check being different from the first identifiers corresponding to any immediately preceding first error check and any immediately succeeding first error check.

19. The multi-processor vehicle control system of claim 18, wherein the second processor is further configured to:

conduct a plurality of second error checks, each second error check conducted in a corresponding iteration, and each second error check configured to detect errors in the first processor based at least in part on a comparison between a check value and a corresponding test key in the corresponding iteration; and assign a second identifier corresponding to each second error check, each second identifier dependent at least in part on whether an error is detected in the corresponding second error check, and the second identifier corresponding to each second error check being different from the second identifiers corresponding to any immediately preceding second error check and any immediately succeeding second error check.

20. The multi-processor vehicle control system of claim 19, wherein:

the first processor is further configured to reset the second processor, if an error is detected in the second processor in the first error checks in at least a first predetermined number of iterations; and the second processor is further configured to disable the first processor, if an error is detected in the first processor in the second error checks in at least a second predetermined number of iterations.

* * * * *